March 17, 1959 — L. E. ELLISON — 2,878,354
ELECTRICAL CORROSION PROBE
Filed July 12, 1956 — 2 Sheets-Sheet 1
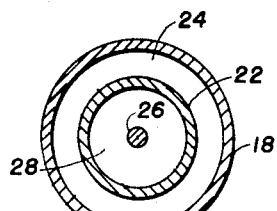
FIG. 2
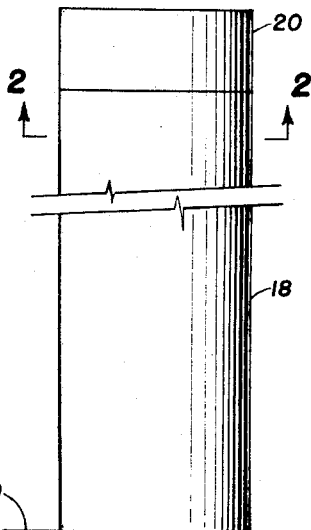
FIG. 1
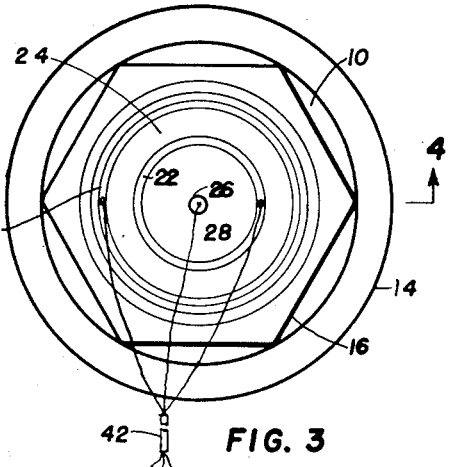
FIG. 4
FIG. 3
INVENTOR.
LYNN E. ELLISON
BY
Edward H. Lang
ATTORNEY March 17, 1959

L. E. ELLISON 2,878,354

ELECTRICAL CORROSION PROBE

Filed July 12, 1956

INVENTOR.
LYNN E. ELLISON
BY
*Edward H Lang*
ATTORNEY

United States Patent Office 2,878,354
Patented Mar. 17, 1959

2,878,354
ELECTRICAL CORROSION PROBE

Lynn E. Ellison, Crystal Lake, Ill., assignor to The Pure Oil Company, Chicago, Ill., a corporation of Ohio Application July 12, 1956, Serial No. 597,368

9 Claims. (Cl. 201—63)

This invention relates to a corrosion test probe for use with apparatus designed to determine the rate of corrosion of materials of construction in terms of metal loss and, more particularly, to a new form of test probe designed for use at elevated temperatures and pressures.

One of the most practical methods of determining the extent of corrosion in operating equipment is by direct observation of the influence of corrosion under actual service conditions whereby the heterogeneity of the corrosive environment is taken into consideration. Various methods have been devised for this purpose including the placement of a metallic specimen in the corrosive environment on a simple type of hanger and the more complicated procedure employing a specimen holder to support a number of test specimens in insulated relationship to exclude galvanic contacts. These methods require tedious weighing and re-weighing of the test specimens and have the additional disadvantage of not being applicable to performing corrosion tests in inaccessible places in the process equipment. Furthermore, the results found from weight-loss methods are subject to errors and a large number of specimens are necessary to determine a proper time-corrosion curve.

Accordingly methods have been devised which make use of the correlation between change in electrical conductivity and change in cross-sectional area to determine the rate of corrosion of materials of construction in a corrosive atmosphere through the use of corrosion test probes connected to electronic resistance-change meters. These instruments employing resistance bridges function like analogue computers to indicate quantitatively those changes in physical characteristics which cannot be conveniently measured by other methods. One application of such a bridge is described in a co-pending application entitled "Apparatus for Determining the Influence of Corrosion on Metallic Materials of Construction," bearing Serial Number 528,032, filed August 12, 1955, by G. A. Marsh and E. Schaschl which relates to means for compensating for temperature changes. In this apparatus, one of the coupons or test specimens in the probe is insulated from the corrosive environment by means of a suitable protective coating. The coupons in the probe are connected so as to comprise one-half of a typical resistance bridge. Suitable electrical connections are made with the other half of the bridge, which is placed outside the corrosive environment along with the power supply to the bridge, and an appropriate electrical meter, such as a galvanometer functioning as a null detector. Loss of metal on the unprotected specimen induces small increases in resistance in the circuit which are correlated with metal loss by appropriate formulae described in the application.

In another copending application entitled "Electronic Resistance-Change Meter," Serial Uumber 528,061, filed August 12, 1955, now Patent No. 2,830,265, by the present inventor there is described an electronic apparatus for conveniently detecting and measuring changes in resistance and provides for the direct reading of the rate of corrosion. The corrosion test probe of the present invention may be used in conjunction with the apparatus described in the foregoing applications. In still another co-pending application by E. Schaschl entitled "Improved Corrosion Test Probes for Use with Corrosion Testing Apparatus" filed March 1, 1956, and bearing Serial Number 568,906, there are described corrosion test probes of increased rigidity, durability and strength. These probes comprise a non-conducting specimen holder which may be in the form of a ceramic core having test specimens attached to the surface thereof by electrolytic deposition or painted circuit methods. The present corrosion test probe is an improvement over the test probes previously proposed in that it is adapted to be used under conditions of high pressure and high temperature, retains the required strength, and durability, and is easy to manufacture.

A primary object of this invention is to provide a metal corrosion test element which comprises an outer first test specimen which is exposed to the corrosive atmosphere to be tested and which serves as a housing to protect a second test specimen from said corrosive atmosphere.

A second object of this invention is to provide a corrosion test probe to be used with the various electrical and electronic resistance-change measuring apparatuses, which is adapted for use in making measurements of the corrosivity of environments under conditions of relatively high temperature and high pressure.

Another object of the invention is to provide a corrosion test probe having rigidly mounted test specimens, one housing and protecting the other and compensating elements, in combination with a two-component base having a pressure seal therein.

A further object is to provide corrosion test probes comprising a first tubular test specimen adapted to be exposed to a corrosive atmosphere on its outside surface which houses an internally-located second test specimen, protected thereby from said corrosive atmosphere, wherein said second test specimen may be in the form of a tube, rod, ribbon and the like, and both of said test specimens have substantially the same resistivity.

These and further objects of the invention will become apparent or be described as the invention is set forth.

The invention is best described by reference to the attached drawings in which:

Figure 1 is a side elevation view of one form of the test probe.

Figure 2 is a horizontal cross-sectional view taken along lines 2—2 of Figure 1.

Figure 3 is a bottom elevation of the form of test probe shown in Figure 1.

Figure 4 is a vertical cross-section taken along lines 4—4 of Figure 3.

Figure 7:
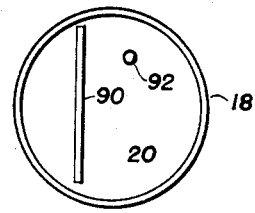
Figure 7 is a bottom view of Figure 6.

Referring to the drawings, in which corresponding parts bear identical numbers, the general mechanical arrangement is as follows: Number 10 refers to a hollow base member having externally threaded portion 12, flange 14 and hexagonally-shaped portion 16. Threaded portion 12 provides means for attaching the test probe through the wall of a process vessel or pipe, as through an internally threaded aperture leading to an area or zone containing the corrosive atmosphere to be tested. Flange 14 may provide a seat for a gasket (not shown) between base 10 and outer wall of the process vessel or pipe to insure an adequate seal against high pressures. Hexagonally-shaped portion 16 facilitates tightening the base member within such an aperture, as by means of a wrench.

The exposed test specimen which acts as a housing is represented by tubular member or test specimen 18 which is composed of the metallic material to be tested in the corrosive atmosphere. Tubular member 18 is attached to end-plate or block 20, preferably of the same metallic composition as tubular member 18. End-plate 20 is of sufficient thickness as to introduce negligible resistance into the electrical system and offer practically no change in resistance due to the corrosion of its exposed surfaces. Tubular member 18 serves as a protective housing for a second tubular member, or test specimen 22, located within the former and spaced therefrom as indicated by annular space 24. Second tubular member 22 is also attached to end-plate 20 and is composed of the same material of construction as exposed member 18, acting therefore as a control resistance. Second tubular member 22 houses centrally located lead 26 and the annular space therebetween is designated at 28. Lead 26 is attached to end-plate 20 in the manner of members 18 and 22. Exposed tubular test specimen 18, and tubular test specimen 22 with or without central lead 26, all attached to end-plate 20, form an integral unit and comprise the structure of the internal portion of the apparatus or the metal corrosion test element adapted to be used with a suitable base.

This unit is fabricated in different sizes, various wall thicknesses and various materials of construction to be tested for use with any type of metal-corroding atmosphere. Central lead 26 is an ordinary conductor forming a common connection to the top ends of tubular test probe members 18 and 22. Lead 26 may be an ordinary wire conductor. The mode of attachment of these parts to end-plate 20 may vary with the manufacturing equipment available and the types of metals or alloys under consideration for testing. The parts may be welded or soldered together. Lead 26 does not have to be centrally located and may pass through annular space 24 or be connected directly to the side of either of the test specimens 18 or 22. For convenience in fabricating this test probe unit and fastening the lead wires thereto, the exposed lower ends terminate at different lengths. Referring to Figure 4, outer test specimen or probe 18 is the shortest, tubular member 22 is intermediate in length and central lead 26 is the longest. Spot-weld or solder-point 30 holds electrical conduit 32 to the lower edge of outer test probe 18, and similarly, solder-point 34 holds lead wire 36 to inner protected test probe 22 and solder-point 38 holds lead wire 40 to central lead 26. Wires 32, 36 and 40 are insulated externally with heat-resistant material and pass into insulated conduit or cable 42 to form a single lead connection to the bridge-measuring apparatus (not shown) with which this test probe is used. Wires 32, 36 and 40 terminate in appropriate tips 44 for ready attachment thereto. A three-prong plug may also be used, so arranged as to be insertable or connected to the proper terminals of a bridge-measuring circuit. These wires may be of different colors for identification.

Figure 5:
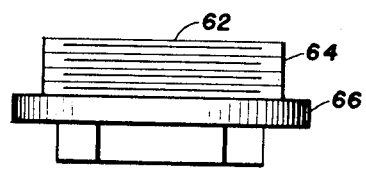
Figure 5 is a side elevation view of a plug that may be used in conjunction with the apparatus.

The test probe unit or element just described is adapted to be held tin pressure-sealed and insulated arrangement in base member 10. For this purpose, base member 10 is provided with aperture 46 extending therethrough and internally threaded at its lower end, as at 48. Aperture 46 is so constructed at the top to form straight shoulder 50 and slanting shoulder 52 against which the top part of gasket 54 impinges under the thrust of ring-shaped packing nut 56, which is externally threaded to engage threads 48. Packing nut 56 is provided with depressions 58 and 60 to be engaged by a tong wrench for tightening same. Other means may be provided for this purpose, thus the internal bottom edge of packing nut 56 may be hexagonal in shape to accommodate and engage a hexagonal-headed Allen wrench. By this construction the test probe unit is held in place only by the outer surface of test specimen 18 through insulating gasket 52 and is spaced from the internal surface of aperture 46 of base 10. Figure 5 illustrates sealing plug 62 for insertion into base 10, with or without the removal of conduit 42, in the event the test probe unit forms a leak during use. For this purpose, plug 62 is provided with external threads 64 to engage threads 48 of base 10, and flange 66 to seal same without removal of packing nut 56. The plug also serves to protect the semi-exposed ends of the test probe unit during shipment or storage.

Figure 9:
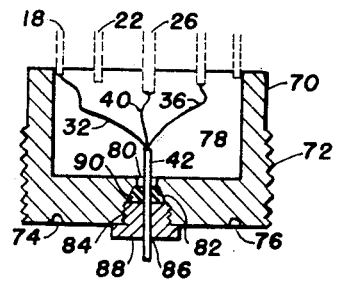
Figure 9 is a vertical cross-sectional view of one form of packing nut that may be used within the apparatus.
Figure 11:
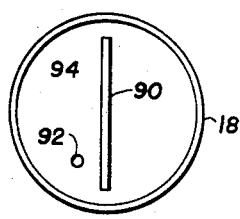
Figure 11 is a bottom view of the embodiment shown in Figure 8.

Referring again to Figures 3 and 4, internal annular spaces 24 and 28 between test probe elements 18 and 22, and lead 26, may be filled with a finely-divided, heat-conducting material which is good electrical insulator. Such material as glass beads mixed with plaster of Paris may be used. The heat conducting, electrical insulating material may be packed in said spaces so as to retain itself therein, or may be held in place by packing nut 70 as shown in Figure 9 in which event space 78 therein will be filled with the heat-conducting electrical-insulating material. The material used for this purpose should be chemically inert under the conditions imposed on the test probe. The use of an electrical insulating packing gives stability to the apparatus and maximum sensitivity, especially where it is necessary to make tubular test element 18 of very thin material.

The first and second test specimens have substantially the same resistivity which means they will have substantially the same chemical composition. This is necessary in order that the bridge-measuring circuit may be made to function accurately without tedious calibration. However, it is unnecessary that the configuration or total resistance of protected and unprotected test specimens be identical. Because the corrosion-measuring process with which the test probe of this invention is used utilizes a comparison method for determining the change in resistance of the unprotected test specimen or resistance element when exposed to corrosive conditions, the bridge circuit in which the test probe is installed during use is initially balanced by adjusting the ratio of the resistance elements. Thus, first test specimen 18 may be tubular in shape and is preferably cylindrical although other cross-sectional forms such as triangular, square, hexagonal, etc., may be used. Any structure of the first test specimen may be used as long as it forms an enclosure or housing, the outside of which is exposed to the corrosive atmosphere and within which the second test specimen is mounted in a manner to be sealed and protected from the corrosive atmosphere. The second test specimen may be any shape or cross-section.

Figure 6:
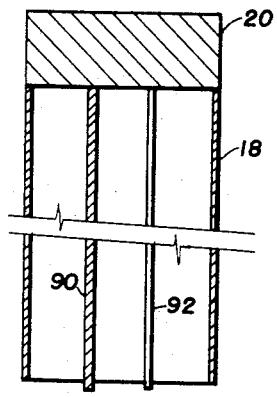
Figure 6 is a vertical cross-sectional view of another form of metal corrosion test element, shown without the base member but which may be used therewith as shown in Figures 1–4, wherein the second test specimen, protected by said tubular test specimen, is in the form of a ribbon or sheet material.

This is illustrated by Figures 6 and 7 wherein another form of metal corrosion test element is shown, similar to that shown in Figures 1–4 but without base 10. In Figures 6 and 7 the number 18 refers to the first test specimen and 20 refers to the end plate. The second test specimen is in the form of ribbon or strip 90 which is attached to end-plate 20 and extends to a point slightly beyond the lower end of test specimen 18, as previously described. Strip test specimen 90, as shown in Figure 7, extends substantially entirely across the inner portion of test specimen 18, but is spaced from the inner walls thereof. The lead necessary to complete the circuit to the Wheatstone bridge arrangement, similar to the arrangement in Figure 4, is in the form of wire 92 which attaches to the under side of end-plate 20 and terminates adjacent the end of test specimen 90. Lead wire 92 is not centered in the apparatus like that shown in Figure 4. Reinforcing material as disclosed in the discussion of Figure 4 may be used in the embodiment shown in Figures 6 and 7.

Figure 8:
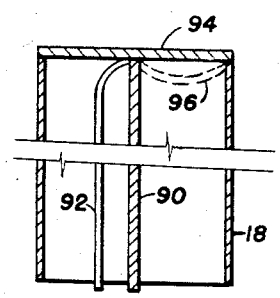
Figure 8 is a vertical cross-section of another form of metal corrosion test element with a different form of end plate.

Another form of a metal corrosion test element is shown in Figure 8, which is comparable to the form shown in Figures 6 and 7 with the exception that end-plate 20 has been replaced by cap 94 to seal off the exposed end of tubular test element 18, and lead 92 is attached to the juncture between inner protected test specimen 90 and cap 94. In the embodiment shown in Figure 8, cap 94 may be formed as an integral part of tubular test element 18, that is, of the same material of construction or be formed of an insulated material of construction. In this latter arrangement, electrical connection 96 between tubular element 18 and inner protected element 90 must be provided as shown by the dotted lines. Electrical connection 96 may be in the form of an imbedded strip conductor in the surface of cap 94 where the latter is formed of a heat-resistant plastic or similar nonconducting material. The inner protected element is spaced from the inner side walls of tubular element 18 in a manner similar to that shown in Figure 7. Lead 92 is similarly spaced between elements 18 and 90 as shown in Figure 7.

Figure 10:
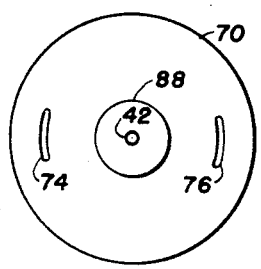
Figure 10 is a half-top elevation view of the packing nut shown in Figure 9.

Referring to Figures 9 and 10, the details of another form of packing nut 70 are shown which may be used in place of packing nut 56 in Figure 4. Packing nut 70 has external threads 72, wrench-engaging depressions 74 and 76 and recess 78 to accommodate the lower ends of test probe members 18 and 22 along with central lead 26, all shown only partially and in dotted lines, and also accommodating lead wires 32, 36 and 40 which form cable 42, recess 78 may be filled with heat-conducting electrical-insulating material as previously described. Cable 42 passes through aperture 80, having slanting shoulder 82 and threaded portion 84, and through aperture 86 of packing nut 88. Packing nut 88 engages gasket 90 to seal cable 42 within the body of nut 70. This arrangement eliminates the necessity for the use of plug 62 (Figure 5) except in the event of failure of gasket 90.

Before use or when new, tubular elements or test specimens 18 and 22 and strip element 90 have substantially the same electrical resistivity and chemical composition, and will ordinarily be made of the materials of construction under investigation or in use in the process vessel or apparatus for which corrosion rates are desired. Wall thickness of from 0.030 to 0.0625 inch may be used for these test specimens. Where the wall thicknesses of tubular probes 18 and 22 are about 0.035 inch and probe 18 has an outside diameter of about ½ inch, the device will withstand pressures up to about 1100 pounds per square inch gauge. When the wall thicknesses are increased on the test probes, or the outside diameters decrease, even higher pressures may be used. The expedient of reinforcing the probe by using heat conducting and electrical insulating materials within annular spaces 24 and 28, or in the embodiments of Figures 6 and 7, allows the use of the apparatus at even higher pressures. With a wall thickness of 0.035 inch for probe 18, and using a mixture of glass beads and plaster in the annular spaces, pressures as high as 2200 lbs. may be used. In general, the pressures within the corrosive atmosphere under test may vary from atmospheric or below to 250 p. s. i. g. without reinforcing where temperatures of from about 100° to 850° F. are encountered. Upon reinforcing the annular spaces, the apparatus may be used in corrosive atmospheres at pressures as high as 2500 p. s. i. g. and temperatures up to about 1000° F. Gaskets 54 and 90 may be made from any electrically insulating, chemically inert material such as Teflon, Mycalex or fiber, etc. Additional gaskets may be used between flange 14 and the wall of the process vessel or between flange 66 of plug 62 and the bottom of base 10.

The invention relates broadly to the idea of using a first test specimen as both a corroding surface on one side, for which accurate measurements of corrosion rates can be made due to changes in resistivity because of diminished cross-sectional area, and as a housing for the control test specimen in the bridge-measuring circuit to protect same from the corrosive atmosphere. Another aspect of the invention is the provision of a metal corrosion test element comprising the tubular test specimen, the inner protected test specimen and the end-plate of negligible resistance wherein the test specimens have substantially the same or different resistivities when the apparatus is fabricated. Still another aspect of the invention lies in the form and construction of the base member used to support the test specimens or resistances in pressure-sealed relationship through a wall confining the corrosive atmosphere in a manner whereby the unprotected element is allowed to corrode and any leakage that may develop can immediately be sealed off.

Advantages of course occur in constructing the metal corrosion test element using resistances or test specimens which have the same resistance value. However, suitable unsymmetrical corrosion testing elements can be fashioned in accordance with this invention in which the resistances of these elements are not identical, provided, for the sake of consistency, a material of construction is employed which is substantially uniform in composition and resistivity. The ratio of the resistance of the unprotected test specimen to the resistance of the protected test specimen, expressed as $$\frac{R \text{ unprotected}}{R \text{ protected}}$$

may vary from values of about 0.1 to 10. When a corrosion test element combination is fabricated from test specimens having different resistances within the above ratios, corresponding changes in the values of the resistances of the other branches of the bridge circuit will have to be made. Although theoretically the above ratios of resistances could vary over wide limits, as a practical matter there are mechanical and electrical factors which have to be taken into consideration in the design of a suitable corrosion testing unit or probe. Lead resistance, for example, will be appreciable if a small corrosion testing probe is used in which the resistance of one element is only about a tenth or less of the resistance of the other element. This factor is not pronounced in the case of large unsymmetrical test elements in which the resistance of even the smaller one is large compared with the lead resistance. Lead resistance can be substantially eliminated by the manner of interconnecting the corrosion-testing unit with the bridge circuit. Mechanical considerations include making the test-probe unit large enough for easy assembly and attachment of the lead wires, and to offset an unbalance in temperature compensation.

From this description it is seen that the invention is necessarily confined to the use of test specimens having the property of conducting electricity and showing a change in resistance proportional to changes in cross-sectional area due to corrosion. The materials of construction that meet these requirements include all metals and metal alloys, such as steel, iron, bronze, brass, copper and the like. The atmosphere to be investigated by the test elements or the completed test probes of this invention may be in any physical state or may exist as a mixture of substances in different physical states. The corrosive atmosphere may be gaseous, vaporous, solid, or semisolid or mixtures of these forms of matter. Examples include corrosive gases such as the halogens, acid or base solutions, flue gases, and mixtures of gases or carrier liquids containing a high content of solids, such as catalyst particles. These atmospheres may be considered to be corrosive either because of their mechanical or chemical effects or combinations of same which result in loss of portions of the exposed test specimen.

Since the test probe of this invention is designed for use at relatively high pressures and temperatures, care should be exercised in the selection of the materials of construction for the base member and associated parts. The thread and gasket-sealing surfaces should be carefully prepared so as to be without roughness or flaws. Thread-sealing compounds may be used on the threaded surfaces to insure against leaks.

Having thus described the invention, the only limitations attaching thereto appear in the appended claims.

What is claimed is:

1. A metal corrosion test element comprising a tubular test specimen, a second test specimen within and spaced from said tubular test specimen, an end-plate attached and sealed across one end of said tubular test specimen, a common electrical lead attached to said end-plate and spaced from said test specimens, said common lead terminating adjacent the opposite ends of said test specimens, and said end-plate being of such size as to offer negligible electrical resistance and substantially no change in resistance upon corrosion of its outer surface.

2. A metal corrosion test element in accordance with claim 1 in which said second test specimen is tubular and said common electrical lead is located within and spaced from said second test specimen.

3. A metal corrosion test element for measuring the corrosivity of an atmosphere comprising a tubular test specimen having one end thereof sealed by an end-plate, a second test specimen attached to said end-plate and extending within and spaced from the inner wall of said tubular test specimen, said end-plate and said tubular test specimen protecting said second test specimen from said atmosphere, an electrical lead connected to said end-plate and extending within the space between said test specimens to the open end of said tubular test specimen, said end-plate being of such size in relation to the size and thickness of said test specimens as to offer negligible electrical resistance and substantially no change in electrical resistance upon corrosion of the outer exposed surface thereof to said atmosphere.

4. A metal corrosion test element for measuring the corrosivity of an atmosphere comprising a first tubular test specimen, an end-plate sealed across one end of said first tubular specimen, a second tubular test specimen attached to said end-plate and extending within and spaced from the inner wall of said first tubular test specimen forming an annular space between the inner wall of said first specimen and the outer wall of said second specimen, an electrical lead attached to said end-plate and extending within said second tubular test specimen to a point adjacent the open end thereof, said test specimens having substantially the same resistivity and said end-plate being sufficient in size in relation to the thickness of said test specimens so as to offer negligible electrical resistance and substantially no change in resistivity upon corrosion of the exposed surface thereof.

5. A metal corrosion test element in accordance with claim 4 in which said annular space and the space between said electrical lead and the inner wall of said second tubular test specimen is filled with a heat-conducting electrical insulating material.

6. A metal corrosion test element in accordance with claim 5 in which said heat-conducting electrical insulating material is a mixture of glass beads and plaster.

7. A corrosion-testing probe adapted to be placed within a corrosive atmosphere to measure the corrosivity thereof by change in resistance of a corroding test specimen composed of the material of construction under test comprising in combination a first tubular test specimen, having one end thereof sealed by an end-plate, a second test specimen attached to said end-plate and extending within and spaced from the inner wall of said tubular test specimen, said end-plate and said tubular test specimen protecting said second test specimen from said corrosive atmosphere, an annular base member having a shouldered opening surrounding but spaced from the open end of said tubular test specimen, a packing nut engaging threads within said opening, said packing nut having a surface opposed to said shouldered opening, an insulating collar surrounding said tubular test specimen, said collar being between said shouldered opening and said opposed surface of said packing nut, and electrical leads connected to said test specimens and to said end-plate, said leads adapted to be connected to a bridge-measuring circuit.

8. A corrosion-testing probe in accordance with claim 7 in which the end opposite said opposed surface of said packing nut is enclosed by a transverse wall member, an aperture through said wall member, a shoulder within said aperture, and a plug threadably engaged within said aperture and impinging upon a second insulating collar surrounding said leads.

9. A corrosion-testing probe in accordance with claim 7 in which said test specimens are composed of a metallic material of construction and said test specimens have substantially the same resistivity and composition.

References Cited in the file of this patent

UNITED STATES PATENTS

| | | |
|---|---|---|
| 2,445,073 | Marette et al. | July 13, 1948 |
| 2,505,936 | Behn | May 2, 1950 |
| 2,616,949 | Cade | Nov. 4, 1952 |
| 2,627,749 | Li | Feb. 10, 1953 |
| 2,763,534 | Campbell | Sept. 18, 1956 |